United States Patent
Staccione et al.

(10) Patent No.: US 6,664,338 B2
(45) Date of Patent: Dec. 16, 2003

(54) CURABLE FLUOROELASTOMERS

(75) Inventors: Anna Staccione, Milan (IT); Margherita Albano, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/127,601

(22) Filed: Apr. 23, 2002

(65) Prior Publication Data

US 2003/0187144 A1 Oct. 2, 2003

(30) Foreign Application Priority Data

Mar. 22, 2002 (IT) .................. MI2002A000598

(51) Int. Cl.$^7$ ................................ C08F 8/00
(52) U.S. Cl. ............... 525/326.3; 524/543; 524/545; 525/326.3; 526/247; 526/250; 526/255
(58) Field of Search ................ 526/255, 247, 526/250; 524/543, 545; 525/326.3

(56) References Cited

U.S. PATENT DOCUMENTS

| | | | |
|---|---|---|---|
| 3,655,727 A | 4/1972 | Patel et al. | 260/470 |
| 3,686,143 A | 8/1972 | Bowman | 260/47 |
| 3,712,877 A | 1/1973 | Patel et al. | 260/87.7 |
| 3,857,807 A | 12/1974 | Kometani et al. | 260/29.6 |
| 3,876,654 A | 4/1975 | Pattison | 260/30.4 |
| 3,933,732 A | 1/1976 | Schmiegel | 260/42.27 |
| 4,233,421 A | 11/1980 | Worm | 525/343 |
| 4,233,427 A | 11/1980 | Bargain et al. | 525/478 |
| 4,259,463 A | 3/1981 | Moggi et al. | 525/331 |
| 4,287,320 A | 9/1981 | Kolb | 525/340 |
| 4,487,903 A * | 12/1984 | Tatemoto et al. | 526/247 |
| 4,524,197 A | 6/1985 | Khan | 526/206 |
| 4,789,717 A | 12/1988 | Giannetti et al. | 526/209 |
| 4,810,760 A | 3/1989 | Strepparola et al. | 525/359.3 |
| 4,864,006 A | 9/1989 | Giannetti et al. | 526/209 |
| 4,882,390 A | 11/1989 | Grootaert et al. | 525/326.3 |
| 4,894,418 A | 1/1990 | Strepparola et al. | 525/185 |
| 4,912,171 A | 3/1990 | Grootaert et al. | 525/340 |
| 5,591,804 A | 1/1997 | Coggio et al. | 525/276 |
| 5,728,773 A | 3/1998 | Jing et al. | 525/146 |
| 5,929,169 A | 7/1999 | Jing et al. | 525/146 |
| 6,005,054 A * | 12/1999 | Barbieri et al. | 525/326.3 |
| 6,111,028 A * | 8/2000 | Brinati et al. | 525/326.3 |
| 6,277,919 B1 * | 8/2001 | Dillon et al. | 525/199 |
| 6,277,937 B1 | 8/2001 | Duvalsaint et al. | 526/255 |
| 6,291,576 B1 * | 9/2001 | Schmiegel | 524/544 |
| 6,461,998 B2 * | 10/2002 | Lenti et al. | 508/182 |
| 2002/0037985 A1 * | 3/2002 | Lyons et al. | 526/247 |

FOREIGN PATENT DOCUMENTS

| | | |
|---|---|---|
| EP | 0 120 462 | 10/1984 |
| EP | 0 182 299 A2 | 5/1986 |
| EP | 0 196 904 A2 | 10/1986 |
| EP | 0 280 312 A2 | 8/1988 |
| EP | 0 335 705 A1 | 10/1989 |
| EP | 0 360 292 A2 | 3/1990 |
| EP | 0 407 937 A1 | 1/1991 |
| EP | 0 684 276 A1 | 11/1995 |
| EP | 0 684 277 A1 | 11/1995 |
| EP | 0 625 526 B1 | 2/1997 |
| EP | 0 661 304 B1 | 10/1997 |

OTHER PUBLICATIONS

West et al., "Fluorinated Elastomers", Kirk–Othmer, Encyclopaedia of Chemical Technology, vol. 8, 3a Ed. John Wiley & Sons, Inc., 1979; pp. 500–515.

Pianca, M. et al., "End Groups in fluoropolymers", J. Fluorine Chemistry, 1999, 95:71–84.

Migrdichian, V., "Organic Synthesis", Reinhold Publishing Corp., NY, NY, 1957; vol. 1, pp. 718–725 and vol. 2, pp. 1709–1715.

* cited by examiner

*Primary Examiner*—David W. Wu
*Assistant Examiner*—Henry S Hu
(74) *Attorney, Agent, or Firm*—Arent Fox Kintner Plotkin & Kahn PLLC

(57) ABSTRACT

Fluoroelastomers curable by ionic route based on vinylidene fluoride (VDF) comprising:

a) 100 parts by weight of fluoroelastomer based on vinylidene fluoride (VDF) substantially polar end group free;

b) from 0.05 to 5 phr of accelerant;

c) from 0.5 to 15 phr of curing agent;

d) from 1 to 40 phr of one or more inorganic acid acceptors, preferably bivalent metal oxides;

e) from 0 to 2.5 phr, preferably from 0 to 1.5 phr of one or more basic compounds preferably hydroxides of bivalent metals or of weak acid metal salts;

f) from 0 to 80 phr of reinforcing fillers.

32 Claims, No Drawings

CURABLE FLUOROELASTOMERS

The present invention relates to curable fluoroelastomers, able to give cured fluoroelastomers with improved sealing properties, i.e. improved compression set on O-ring, improved mechanical properties shown as improved combination of stress and elongation at break.

More specifically the curable fluoroelastomers of the invention are cured by ionic route. The cured fluoroelastomers of the present invention are used in the preparation of O-rings, gaskets, shaft seals, fuel hoses, etc. The O-rings obtained with the curable invention compositions show an improved compression set value and an improved combination of stress at break and elongation at break. The shaft seals show an improved combination of stress at break and elongation at break. Besides the curable fluoroelastomers of the present invention crosslink in short times.

It is well known that one of the most important applications of fluoroelastomers relates to the preparation of O-rings. They are obtained from fluoroelastomeric copolymers based on units deriving from vinylidenfluoride (VDF), hexafluoropropene (HFP), optionally tetrafluoroethylene (TFE).

The fluoroelastomers used in said application must have high elastomeric properties at low and at high temperatures and must show a good processability so that they can be easily injection moulded with automatic cycles.

The need was felt to have available curable VDF-based fluoroelastomers to prepare the above manufactured articles having the optimal combination of the mentioned properties.

An object of the present invention are fluoroelastomers curable by ionic route based on vinylidene fluoride (VDF) comprising:
- a) 100 parts by weight of fluoroelastomer based on vinylidene fluoride (VDF) substantially polar end group free;
- b) from 0.05 to 5 phr of accelerant;
- c) from 0.5 to 15 phr of curing agent;
- d) from 1 to 40 phr of one or more inorganic acid acceptors, preferably bivalent metal oxides;
- e) from 0 to 2.5 phr, preferably from 0 to 1.5 phr of one or more basic compounds preferably hydroxides of bivalent metals or of weak acid metal salts;
- f) from 0 to 80 phr of reinforcing fillers.

The fluoroelastomers component a) comprise VDF copolymers containing at least another ethylenically unsaturated fluorinated comonomer. This can be selected for example from the following:
- $C_2$–$C_8$ perfluoroolefins, such as hexafluoropropene (HEP), tetrafluoroethylene (TFE);
- $C_2$–$C_8$ fluoroolefins containing hydrogen and/or chlorine and/or bromine and/or fluorine, such as trifluoroethylene, pentafluoropropene, chlorotrifluoroetheylene (CTFE), bromotrifluoroethylene;
- fluorovinylethers (VE) preferably selected from:
    (per) fluoroalkylvinylethers (PAVE) $CF_2=CFOR_f$ wherein $R_f$ is a $C_1$–$C_6$ (per)fluoroalkyl, for example trifluoromethyl, bromodifluoromethyl, pentafluoropropyl;
    perfluoro-oxyalkylvinylethers $CF_2=CFOX$, wherein X is a $C_1$–$C_{12}$ perfluoro-oxyalkyl having one or more ether groups, for example perfluoro-2-propoxypropyl;
    $CF_2=CFOCF_2OCF_2CF_3$ (A-III) and
    $CF_2=CFOCF_2OCF_2CF_2OCF_3$ (A-IV).

The fluoroelastomers object of the present invention can also contain units deriving from non fluorinated ethylenically unsaturated monomers, in particular non fluorinated $C_2$–$C_3$ olefins (Ol), such as ethylene and propylene.

In the polymer also small amounts in the range 0.01–5% by moles of units deriving from a fluorinated bis-olefin, can be present. The bis-olefins described in European patent 661,304, herein incorporated by reference, can for example be used.

Preferred compositions of the fluoroelastomers component a) are the following (% by moles):
- VDF 45–35%, HFP 15–45%, TFE 0–3%;
- VDF 20–30%, HFP 15–40%, TFE OL 5–30%, PAVE 0–35%;
- VDF 60–75%, HFP 10–25%, VE 0–15%, TFE 0–20%.

The fluoroelastomers component a) as said are substantially polar end group free. With end groups, all the groups present at the ends of the main polymer chain or of the optionally present side chains, are meant. With polar groups it is meant groups both of ionic type, such carboxylate —$COO_-$ and sulphate —$OSO_3^-$ groups, and of non ionic type, such alcoholic —$CH_2OH$, acylfluoride —COF, amidic —$CONH_2$ groups, and so on. With "substantially polar group free" it is meant that the amount of polar end groups is lower than 3% by moles, preferably lower than 1% by moles with respect to the total amount of the end groups present in the polymer, still more preferably it is zero. It is meant that the amount of polar groups is zero when the amount of each type of polar end groups present is lower than the detectability limit according to the method reported in the Examples, i.e. lower than 1 mmole/Kg of polymer.

The usable accelerant component b) is formed by an organic-onium derivative. The organic-onium derivatives usable for the invention generally contain at least one heteroatom, for example, N, P, S, O linked to organic or inorganic groups. The organic-onium compounds suitable to be used in the invention are for example those described in U.S. Pat. Nos. 3,655,727, 3,712,877, 3,857,807, 3,686,143, 3,933,732, 3,876,654, 4,233,421, 4,259,463, 4,882,390, 4,912,171, 5,591,804, EP 182,299, EP 120,462; West and Holcomb, "Fluorinated Elastomers", Kirk-Othmer; Encyclopedia of Chemical Technology, vol. 8, 3rd Ed. John Wiley & Sons, Inc., pp. 500–515 (1979).

The organic -onium compounds which can be used belong for example to the following classes:
A) compounds having general formula:

(I)

wherein:
Q has the following meanings: nitrogen, phosphor, arsenic, antimony, sulphur;
$X_I$ is an organic or inorganic anion such for example halide, sulphate, acetate, phosphate, phosphonate, hydroxide, alkoxide, phenate, bisphenate;
n is the valence of the $X_I$ ion;
$R^2, R^3, R^4, R^5$, independently the one from the other, have the following meanings:
    $C_1$–$C_{20}$ alkyl, $C_6$–$C_{20}$ aryl or arylalkyl, $C_1$–$C_{20}$alkenyls, or a combination thereof;
    halogen, selected from chlorine, fluorine, bromine; or cyano groups, —$OR_B$ and $COOR_B$, wherein $R_{B'}$ is an alkyl, aryl, arylalkyl or alkenyl having the above meanings;

wherein two radicals of the $R^2, R^3, R^4, R^5$ group can form with the heteroatom Q a cyclic structure;

when Q is a sulphur atom one of the $R^2, R^3, R^4, R^5$ radicals is not present;

B) amino-phosphonium derivatives having the following general formulas:

$$mI[P(NR^6R^7)_nIR^8_{4-nI}]^{30}Y^{mI-} \quad \text{(II)}$$

$$R^9[P(NR^6R^7)_rR_{83-r}]_{2+p}Y^{mI-} \quad \text{(III)}$$

wherein:

$R^6, R^7$ and $R^8$, equal or different, have the following meanings:

$C_1-C_{18}$, preferably $C_1-C_{12}$ alkyl, cycloalkyl, $C_6-C^{18}$, preferably $C_6-C_{12}$, aryl or arylakyl;

oxyalkyl or poly(oxyalkyl) wherein the alkyl is as above and the polyoxyalkyl radical has a free or etherified terminal OH function; $R^6$, $R^7$ and $R^8$ can optionally contain halogens, ON, OH, carbalkoxy groups; wherein $R^6$ and $R^7$ can form with the nitrogen atom an heterocyclic ring;

$R^9$ is a $C_1-C_6$ bivalent alkylenic, oxyalkylenic or $C_6-C_{12}$ arylenic radical;

nI is an integer from 1 to 4;

r is an integer from 1 to 3;

mI is an integer from to 1 to 2 and corresponds to the Y ion valence;

p is a coefficient such that mIxp=2;

Y is an anion having valence m and can be organic or inorganic; or example Y can be selected from halides, perchlorate, nitrate, tetrafluoroborate, hexafluorophosphate, oxalate, acetate, stearate, haloacetate, para-toluensulphonate, phenate, bisphenate, hydroxide; Y can also be a complex anion for example $ZnCl_4^{2-}$, $CdCl_4^{2-}$, $NiBr_3^-$:

C) phosphoranes, in particular triarylphosphoranes, having formula:

$$Ar_3P=C\begin{matrix}R^{10}\\R^{11}\end{matrix} \quad \text{(IV)}$$

wherein:

Ar is phenyl, substituted phenyl (as for example methoxyphenyl, chlorophenyl, tolyl), naphthyl;

$R^{10}$ is hydrogen, methyl, ethyl, propyl, carbalkoxy;

$R^{11}$ is carabalkoxy, $C_1-C_8$ alkyls, cyano, and amidic;

or $R^{10}$ with the carbon, atom of the P=C bond forms a cyclic group, example cyclopentadiene;

D) iminium salts having formula

$$[N(R^{12})_2]^{c+}X_c^{c-} \quad \text{(V)}$$

wherein:

$R^{12}$ is a monovalent organic radical ended with an heteroatom, as P, S, O or N, such that the organic radical is covalently linked to the nitrogen atom through said heteroatom;

c is the valence of the $X_c$ anion;

$X_c$ is an organic or inorganic anion, for example halide, hydroxide, sulphate, thiosulphate, nitrate, formate, acetate, cyanate, thyiocyanate, tetraphenolborate, phosphate, phosphonate, alkoxide, phenate, biphenate, or perchlorate.

Examples of the onium-organic derivatives of class A) are the following: triphenylbenzylphosphonium chloride, tetraphenylphosphonium chloride, tetrabutylammonium chloride, tetrabutylammonium bisulphate, tetrabutylammonium bromide, tributylallylphosphonium chloride, tributylbenzylphosphonium chloride, dibutyldiphenylphosphonium chloride, tetrabutylphosphonium chloride, triarylsulphonium chloride.

Examples of amino-phosphonium derivatives of class B) are benzyldiphenyl(diethylamino)phosphonium and benzyltris(dimethylamino)phosphonium salts.

An example of the compounds of class D) is 8-benzyl-1, 8-diazobicyclo[5,4,0]-7-undecene chloride.

Preferably quaternary ammonium or phosphonium salts are used, see for example EP 335,705 and U.S. Pat. No. 3,876,654; amino-phosphonium salts, see for example U.S. Pat. No. 4,259,463; phosphoranes, see for example U.S. Pat. No. 3,752,787.

Mixtures of -onium organic derivatives can also be used.

As curing agent component c), aromatic or aliphatic polyhydroxylated compounds or derivatives thereof can be used, as described for example in EP 335,705 and U.S. Pat. No. 4,233,427. For example di- tri- and tetrahydroxybenzenes, naphtalenes, anthracenes and bisphenols of formula

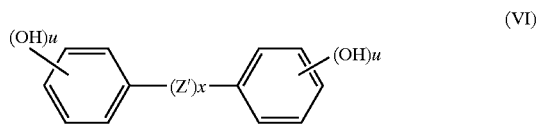

can be mentioned, wherein:

Z' has one of the following meanings:

bivalent radical $C_1-C_{13}$ aliphatic, linear or branched, $C_4-C_{13}$ cycloaliphatic, $C_6-C_{13}$ aromatic or arylalkylenic, optionally substituted with at least one chlorine or fluorine atom;

a thio, oxy, carbonyl, sulphinyl or sulphonyl radical;

x is 0 or 1;

u is 1 or 2;

the aromatic rings of the compound of formula (VI) can optionally have other substituents selected from chlorine, fluorine or bromine; —CHO, $C_1-C_8$ alkoxy, —COOR$_{10}$, wherein $R_{10}$ is H or $C_1-C_8$ alkyl, $C_6-C_{14}$ aryl, $C_4-C_{12}$ cycloalkyl.

When in formula (VI) Z' is alkylene it can be for example methylene, ethylene, chloroethylene, fluoroethylene, difluoroethylene, 1,3-propylene, tetramethylene, chlorotetramethylene, fluorotetramethylene, trifluorotetramethylene, 2-methyl-1,3-propylene, 2-methyl-1,2-propylene, pentame-thylene, hexamethylene. When Z' is an alkylidene it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, 1,1-cyclohexylidene.

When Z' is a cycloalkylene, it can be for example 1,4-cyclohexylene, 2-chloro-1,4-cyclohexylene, 2-fluoro-1,4-cyclohexylene, 1,3-cyclohexylene, cyclopentylene, chlorocyclo-pentylene, fluorocyclopentylene, and cycloheptylene. Besides Z' can be an arylene radical, as m-phenylene, p-phenylene, 2-chloro-1,4-phenylene, 2-fluoro-1,4-phenylene, o-phenylene, methyl phenylene, dimethylphenylene, trimethylphenylene, tetramethyl phenylene, 1,4-naphthylene, 3-fluoro-1,4-naphthylene, 5-chloro-1,4-naphthylene, 1,5-naphthylene and 2,6-naphthylene.

Among the curing agents of formula (VI) hexafluoroisopropylidene bis (4-hydroxybenzene), known as bisphenol AF, 4,4'-dihydroxydiphenyl sulphone and isopropylidene bis (4-hydroxybenzene) known as bisphenol A, are preferred.

Other polyhydroxylic compounds usable as curing agents are for example dihydroxybenzenes as catechol, resorcinol, 2-methyl resorcinol, 5-methyl resorcinol, hydroquinone, 2-methyl hydroquinone, 2,5-dimethyl hydroquinone, 2-t-butyl hydro-quinone, 1,5-dehydroxynaphthalene.

Other curing agents based on polyols are the salts formed by the anion of a bisphenol with cations of alkaline metals, such for example the dipotassic salt of bisphenol AF and the monosodic monopotassic salt of bisphenol AF.

As curing agents -onium biphenates, i.e. salts of a bisphenol in which one or both the hydroxyls are in the form of -onium salt can also be used. As counterions of the bisphenate all the cations corresponding to the above -onium organic derivatives accelerants component b) can be used.

Other curing agents are for example described in EP 335,705 and U.S. Pat. No. 4,233,427.

In the curable fluoroelastomers instead of component b) and c) an adduct of component b) with component c) is used. In particular an adduct formed by bishphenol and an -onium salt, preferably in molar ratios curing agent: accelerant from 1:1 to 5:1, preferably from 2:to 5:1, is used.

Said adducts are obtained by melting of the reaction product between the accelerant and the curing agent in the indicated molar ratios, or by melting of the adduct 1:1 added with the curing agent in the indicated amounts.

Optionally when the adduct is used, also an amount of free accelerant in addition to that contained in the adduct can be present.

Optionally, preferably, when the adduct is used an amount of free curing agent in addition to that contained in the adduct can be present.

For the adduct preparation the following cations are particularly preferred: 1,1-diphenyl-1-benzyl-N-diethyl-phosphoranamine, tetrabutyl phosphonium, tetrabutyl ammonium; among anions are particularly preferred the bisphenol compounds wherein the two aromatic rings are linked by an alkylenic group selected from the perfluoroalkylenic groups having from 3 to 7 carbon atoms, and the OH in the aromatic rings are in para position.

The preparation of the adduct is described in the European patent applications in the name of the Applicant EP 684,277, EP 684,276 herein incorporated by reference.

Other compounds usable as curing agents are the following:

Difunctional fluoroethers and fluoropolyethers selected from the following:

HOCH$_2$—CF$_2$OCF$_2$CF$_2$OCF$_2$—CH$_2$OH

HOCH$_2$—CF$_2$O(CF$_2$CF$_2$OCF$_2$CF$_2$OCF$_2$O)$_z$CF$_2$—CH$_2$OH

HOCH$_2$—CF$_2$CF$_2$OCF$_2$CF$_2$—CH$_2$OH

H$_2$NCH$_2$—CF$_2$O(CF$_2$CF$_2$OCF$_2$CF$_2$OCF$_2$O)$_z$CF$_2$—$_{CH_2}$NH$_2$ wherein Z is an integer from 1 to 15.

Said compounds are described in U.S. Pat. No. 4,810,760 and 4,894,418.

It is also possible to use the salts of the aforesaid difunctional fluoropolyethers, which show the advantage to be more easily incorporated in the fluoroelastomer. In said salts, at least one of the two end groups is a metal alcoholate, preferably of a bivalent metal, or it is an ammonium salt when the starting end groups are aminic.

Examples of end groups of the first type are —CH$_2$OMgOH, —CH$_2$OCaOH, —CH$_2$OZnOH; an end group of the second type is for example —CH$_2$NH$_3^+$Cl$^-$.

Polyols wherein one or more hydroxyl groups are blocked as esters or carbonates.

Said class of compounds comprises polyhydroxylated compounds, in particular the above mentioned polyphenols and difunctional fluoro polyethers, wherein at least one of the hydroxyl groups is substituted by an ester or carbonate group. Said compounds are described in U.S. Pat. No. 5,728,773 and 5,929,169.

Polyols wherein one or more hydroxyl groups are blocked or protected in the form of silylethers.

Said class of compounds comprises polyhydroxylated compounds, in particular the above mentioned polyphenols and difunctional fluoropolyethers, wherein at least one of the hydroxyl groups is substituted by a —OSiR$^k_3$ group wherein R$^k$ is a radical having a C$_1$–C$_{20}$ aliphatic, linear or branched, C$_3$–C$_{20}$ cycloaliphatic or C$_6$–C$_{20}$ aromatic structure containing hydrogen and/or fluorine. 4,4'-hexafluoroisopropylidenbis-(trimethyl silyldiphenol) is preferred. This class of compounds is described in EP 879,851.

Component d) is selected from those used in ionic curing of vinylidene fluoride copolymers. ZnO, MgO, PbO can be mentioned.

Component e) is selected from those known in ionic curing of vinylidene fluoride copolymers. For example hydroxides can be mentioned. They are preferably selected for example from Ca(OH)$_2$, Sr (OH)$_2$, Ba(OH)$_2$. Other examples of component e) are the metal salts of weak acids, such for example carbonates, benzoates, oxalates and phosphites of Ca, Sr, Ba, Na and K. Mixtures of said hydroxides with the aforesaid metal salts can also be used.

Component f) is preferably selected from the following: carbon black, barium sulphate, silicas, silicates, semi-crystalline fluoropolymers. The semi-crystalline fluoropolymers have sizes from 5 to 90 nm, preferably from 10 to 60. As semi-crystalline fluoropolymer it is meant a fluoropolymer which shows, besides the glass transition temperature Tg, at least one melting temperature. An example of semi-crystalline fluoropolymer is that based on modified PTFE I.e. it comprises at least one comonomer containing at least one ethylene unsaturation both of hydrogenated and fluorinated type. Among those hydrogenated ethylene, propylene, acrylic monomers, for example methylmethacrylate, (meth) acrylic acid, butylacrylate, hydroxyethylhexylacrylate, styrene monomers can be mentioned.

Among fluorinated comonomers it can be mentioned:

C$_3$–C$_8$ perfluoroolefins, such hexafluoropropene (HFP), hexafluoroisobutene;

C$_2$–C$_8$ hydrogenated fluoroolefins, such as vinyl fluoride (VF), vinylidene fluoride (VDF), trifluoroethylene, perfluoroalkylethylene CH$_2$=CH—R$_f$, wherein R$_f$ is a C$_1$–C$_6$ perfluoroalkyl;

C$_2$–C$_8$ chlorofluoroolefins, such as chlorotrifluoroethylene (CTFE);

(per)fluoroalkylvinylethers PAVE) CF$_2$=CFOR$_f$ wherein R$_f$ is a C$_1$–C$_6$ (per) fluoralkyl, for example CF$_3$, C$_2$F$_5$, C$_3$F$_7$;

(per)fluoro-oxyalkylvinylethers CF$_2$=CFOX, wherein X is: a C$_1$–C$_{12}$ alkyl or a C$_1$–C$_{12}$ oxyalkyl or a C$_1$–C$_{12}$ (per)fluorooxyalkyl having one or more ether groups, for example perfluoro-2-propoxy-propyl; fluorodioxoles, preferably perfluorodioxoles;

fluorovinylethers of general formula CFX$_{AI}$=CX$_{AI}$OCF$_2$O—R$_{AI}$ (A-I) wherein R$_{AI}$ is a $C_2$–$C_6$ linear, branched or $C_5$–$C_6$ cyclic (per) fluoroalkylic group, or a $C_2$–$C_6$ linear, branched (per)fluorooxyalkyl group containing from one to three oxygen atoms; when $R_{Af}$ is a fluoroalkyl or a fluorooxyalkyl group as above defined it can contain from 1 to 2 atoms, equal or different, selected from the following: H, Cl, Br, I; $X_{Af}$=F, H; the compounds of general formula: $CFX_{Af}$=$CX_{Af}OCF_2OCF_2Y_{Af}$(A-II), wherein $Y_{Af}$=F, $OCF_3$; $X_{Af}$ as above are preferred; in particular $CF_2$=$CFOCF_2OCF_2CF_3$ (A-III) and $CF_2$=$CFOCF_2OCF_2CF_2OCF_3$ (A-IV) are preferred.

PAVEs, in particular perfluoromethyl-, ethyl-, propylvinylether are preferred comonomers.

To the curing blend other conventional additives, such as thickeners, pigments, antioxidants, stabilizers, processing supporting agents and the like can then be added. As processing supporting agents esters and amides of fat acids, long chain aliphatic alcohols, polyethylene having low molecular weight, stearic acid and its inorganic salts can be added to the curing blend. The amounts of supporting agents are generally lower than 10 phr, preferably lower than 5 phr.

Other compounds which can be added to the curable compositions of the present invention are sulphur oxides diorgano substituted, for example sulphones and sulpholanes in amounts from 0.0 to 5 phr. Said compounds are able to increase the blend curing rate. Said compounds are described for example in U.S. Pat. No. 4,287,32. The sulphur oxides diorgano substituted preferably contain at least one S atom, one or two oxygen atoms linked only to the sulphur atom, and two organic radicals R' and R" linked to the sulphur atom by carbon-sulphur bonds having general formula:

$$((R')(R'')S(O)_{kA} \qquad (VI)$$

wherein:

xA is 1 or 2;

R' and R", equal or different, are organic radicals, containing from one to 20 or more carbon atoms, up to a maximum of 30; preferably from 1 to 8 carbon atoms; R' and R" together can form an only alkylenic group, forming with the sulphur atom a heterocyclic ring; R' and R" being formed by an aliphatic linear, branched or cyclic or aromatic chain of carbon atoms, R' and R" can optionally contain heteroatoms, for example oxygen, and/or substituents, for example halides, alkoxy, sulphinyl, sulphonyl, carbalkoxy, oxy, hydroxyls, nitro, cyano, alkyls, aryls.

The sulphur oxides diorgano substituted comprise the diorgano sulphoxides and diorgano sulphones and are described for example in "Organic Syntheses", Vol. I, pp. 718–725, Vol. II, pp. 1709–1715, Reinhold Publishing Co., N.Y., N.Y., 1957. Dimethylsulphone, tetramethylensulphone, and bis (4-chlorophenyl)sulphone are particularly preferred. Tetramethylensulphone in amounts from 0.01 to 5 phr is preferably used.

The fluoroelastomers component a) are obtained by radical polymerization. For example radical initiators, preferably an organic peroxide, can be used, which can be selected in particular from:

I) dialkylperoxides, wherein the alkyl has from 1 to 12 carbon atoms, as di-ter-butylperoxide (DTBP);

II) dialylkperoxydicarbonates, wherein the alkyl has from 1 to carbon atoms, as diisopropylperoxydicarbonate (IPP), di-sec-butylperoxydicarbonate, di-sec-hexylperoxy dicarbonate, di-n-propylperoxydicarbonate, and di-n-butyl peroxydicarbonate;

III) peroxyesters, having from 3 to 20 carbon atoms, as ter-butylperoxyisobutyrate and ter-butylperoxypivalate;

IV) diacylperoxides, where the acyl has from 2 to 12 carbon atoms, as diacetylperoxide and dipropionylperoxide; di(perfluoroacyl)peroxides, or di(chlorofluoroacyl)peroxides, as di(perfluoropropionyl) peroxide and di(tri-chloro-octa fluorohexa-noyl) peroxide.

The peroxide use of groups I) and II) is preferred, respectively, the use of DTBP and of IPP is more preferred.

The process for preparing the fluoroelastomers of the invention can be carried out for example by copolymerization of the corresponding monomers in aqueous emulsion in the presence o a radical initiator, preferably an organic peroxide as above defined. The polymerization in emulsion can be carried out according to known methods such for example those described in Kirk Othmer, Encyclopaedia of Chemical Technology vol. 8, pp. 500 and those following, 1979. The process temperature is in the range 100°–150° C., preferably 105°–130° C. One can operate at pressures comprised between 10 and 100 bar, preferably between 20 and 50 bar. As known, the polymerization in emulsion requires also the presence of surfactants. The surfactants at least partially fluorinated, corresponding to the general formula:

$$R_f\text{—}X^{3-}M^+$$

are particularly preferred, wherein $R_f$ is a $C_5$–$C_{16}$ (per) fluoroalkyl chain or a (per)fluoropolyoxyalkylenic chain, $X^{B-}$ is —$CCO^-$ or —$SO_3^-$, $M^+$is selected from: $H^+$, $NH_4^+$, an alkaline metal ion. Among the most commonly used we remember: ammonium perfluoro-octanoate, (per) fluoropolyoxyalkylenes ended with one or more carboxylic groups, optionally salified with sodium, ammonium and alkaline metals in general, preferably, sodium, partially fluorinated alkylsulphonates. See or example U.S. Pat. No. 4,524,197. To the reaction mixture chain transfer agents, selectd from those commonly used in the fluoroelastomer synthesis, can be added. It can be mentioned: hydrogen, hydrocarbons having from 1 to 12 carbon atoms, for example methane, ethane, methylcyclopentane; chloro (fluoro)carbons having from 1 to 10 carbon atoms, optionally containing hydrogen, for example, chloroform, trichlorofluoromethane; esters, alcohols, ethers having from 1 to 12 carbon atoms, for example ethylacetate, diethylmalonate, diethylether, isopropanol, and the like. Other chain tranfer agents are for example the following:

iodinated and/or brominated chain transfer agents, such for example the compounds of general formula $Rf_b(I)_{xB}(Br)_y$ ($Rf_b$=perfluorinated hydrocarbon radical containing from 1 to 8 carbon atoms, xB, y=integers between 0 and 2, with at least xB or y=1 and xB+y≦2);

iodides and/or bromides of alkaline or alkaline-earth metals, according to European patent application 407, 937.

When the polymerization in emulsion is completed, the fluoroelastomer is isolated from the polymer latex by known methods, as the coagulation by addition of electrolytes or by cooling.

The fluoroelastomer preparation of the present invention can advantageously be carried out in aqueous emulsion in the presence of microemulsions of perfluoropolyoxyalkyleness, according to U.S. Pat. No. 4,864,006, or also of microemulsions of fluoropolyoxyalkylenes having hydrogenated end groups and/or hydrogenated repeating units, according to EP 625,526.

Said last process is preferred (see the Examples).

The polymerization can advantageously be carried out also using, instead of a microemulsion, an emulsion or dispersion of perfluoropolyoxyalkylenes and water according to U.S. Pat. No. 4,789,717.

To this purpose also the emulsions and dispersions of perfluorooxyalkylenes and water described for example in patent applications EP 196,904, E 280,312 and EP 360,292 can be used.

An example of another method usable to prepare the floroelastomers of the present invention is the polymerization in suspension as described in U.S. Pat. No. 6,277,937.

The compositions object of the present invention are cured by ionic route, as well known in the prior art.

As said, the cured fluoroelastomers of the present invention can be used also as O-rings, gaskets, shaft seals, hoses, profiles, etc. They are suitable also for gaskets with metal inserts generally used for articles of big sizes for applications in the car and chemical industry.

The fluoroelastomers of the present invention after curing in press at high temperature, generally from 170° C. to 230° C., and even short post-treatment times, generally of the order of 1–2 hours, show final mechanical and compression set property values already stabilized. The values of said properties remain substantially unchanged with respect to conventional post-treatments, of the order of 24 hours at 250°.

It has been surprisingly found that the cured fluoroelastomers of the present invention do not show defects on the manufactured article and therefore they allow the discard reduction during the processing step in comparison with the cured fluoroelastomers of the prior art.

The present invention will now be better illustrated by the following Examples which have a merely indicative but not limitative purpose for the scope of the invention itself.

EXAMPLES

Polar End Group Determination

The determination is carried out by FT-IR, $^1$H-NMR (300 MHz) and $^{19}$F-NMR (188 MHz) analyses. The method is described in M. Pianca, J. Fluorine Chem. 9(1999) 71–84.

Polar end groups are for example the following: —$CH_2OH$, carboxyl, —COF, —$CONH_2$, —$OSO^{3-}$.

Detectability limit of the method: 0.1 mmoles/Kg. Below the detectability limit the ionic end groups are considered absent.

Characterization Methods of the Fluoroelastomeric Composition of the Invention Viscosity The Mooney viscosity ML (1+10) at 121° C. and the Mooney scorch MS at 135° C. have been determined according to ASTM D 1646.

Scorch Time

The scorch time t15, shown in Tables, corresponding to the necessary time to reach a Mooney viscosity equal to the minimum viscosity MV+15 Mooney points.

The properties of the crosslinking process have been determined according to the ASTM D 5289 method, using a MDR (Moving Die Rheometer) 2000E Alpha Tecnologies Ltd. The following test conditions have been used:

oscillation frequency: 1.66 MHz;
oscillation amplitude: +/−0.5 degrees;
temperature: 177° C.;
specimen weight: 7–8 g;
test duration: sufficient to reach the plateau.

The following parameters have been recorded:

ML: minimum torque level, expressed in units of lbf.in;
MHF: maximum torque level at plateau, in units of lbf.in
ts2: time necessary to reach a torque equal to ML+2 lbf.in
t'x: time necessary to reach torque equal to ML+x(MHF-NTL)/100, with x=50, 90, 95.

Mechanical and Sealing Property Determination

13×13×2 mm plaques and O-rings 214 have been cured in press at 177° C. for a time equal to t'95 of the MDR curve, and then post-treated in an air circulating stove at 250° C. for the time specified in the Examples.

The tensile properties have been determined on specimens punched from the plaques, according to the ASTM D 412 method, method C. The Shore A hardness (3") has been determined on 3 pieces of plaque piled according to the ASTM D 2240 method.

The compression set has been determined on O-ring 214, according to the ASTM D 1414 method.

Microemulsion Preparation

Into a glass reactor equipped with stirrer, under mild stirring, the following components for the preparation of 1 Kg of microemulsion are fed as follows. The correspondence by volume is equal to 782 ml.

1) 170 ml of acid having a number average molecular weight 600 and the formula, are fed into the reactor:

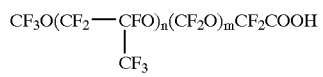

wherein n/m=10

2) 170 ml of an aqueous emulsion of ammonium hydroxide at 30% by volume are added;
3) 340 ml of demineralized water are added;
4) 102 ml of Galden® D02 of formula: $CF_3O(CF_2$—CF$(CF_3)O)_n(CF_2O)_mCF_2COOH$
are added, wherein n/m=20 and having average molecular weight of 450.

Example 1

Preparation of a VD/HFP Copolymer According to the Present Invention and Preparation of the Respective Formulations without Component e)

In a 2l horizontal reactor, equipped with a stirrer working at 50 rpm 15 l of water and 150 g of the microemulsion prepared according to the described procedure are introduced.

The reactor is heated up to 122° C. and then brought to the pressure of 35 relative bar by feeding the monomers until having the following composition of the gaseous phase: VDF=53% by moles HFP=47% by moles.

Due to the feeding of 12 g of diterbutylperoxide (DTBP) the reaction starts and the pressure is kept constant for the whole polymerization by feeding a mixture formed by:

VDF=78.5% by moles,
HFP=21.5% by moles.

After a prefixed amount of monomeric mixture corresponding to 4,500 g has reacted, the reaction stopped. The total polymerization time results equal to 265 minutes.

The latex which has a concentration of 271 g/l latex is then coagulated by using an electrolyte agent (aluminum sulphate), washed and dried at 800° C. for 24 h.

The obtained polymer has a Mooney viscosity ML (1+10 at 121° C.) equal to 44.

The $^{19}$F NMR analysis shows the following composition: 79.3% molar of HFP, 20.7% molar of VDF.

The analyses of the end groups carried out by FT-IR, $^1$H-NMR $^{19}$F-NMR have shown the presence of end groups $CF_2H$ and $CH_3$ and the total absence of polar end groups (<0.1 mmoles/Kg), such $CH_2OH$, carbonyl and carboxyl groups.

The fluorcelastomer has been formulated as described in Table 1. The Tecnoflon FOR XA51 (adduct b)+c)) is the adduct bisphenol AF/1,1,-diphenyl-1-benzyl-N-diethylphosphoramine in the 5/1 ratio.

In the formulation 1.1686mmhr of component b) and 6.5 mmhr of component c) are present (molar ratio accelerant/curing agent 0.17). The amounts of adduct b)+c) in phr and of component c) in phr correspond to 1.1 mmhr of accelerant and 6.5 mmhr of curing agent as above indicated. These amounts remain unchanged in the comparative Examples 2–6.

The rheometric and mechanical properties data are shown in the same Table.

Example 2

Preparation of a Formulation of the Copolymer of Example 1 wherein 1 phr of Component e) Is Used The fluoroelastomer has been formulated as described in Table 1. The rheometric and of mechanical properties data are shown in the same Table.

Example 3 (Comparative)

Preparation of a Formulation of the Copolymer of Example 1 wherein 6 phr of Component e) Are Used The fluoroelastomer has been formulated as described in Table 1. The rheometric and mechanical properties data are shown in the same Table.

As it can be noticed, the values of stress at break and compression set are worse than the corresponding values of the Examples of the invention.

Example 4 (Comparative)

Preparation of a Formulation of the Copolymer of Example 1 wherein 3 phr of Component e) Are Used The fluoroelastomer has been formulated as described in Table 1. The rheometric and mechanical properties data are shown in the same Table.

As it can be noticed, the values of stress at break and of compression set are worse than the corresponding values of the Examples of the invention.

Example 5 (Comparative)

Preparation of a Formulation VDF/HFP Copolymer Having Ionic End Groups, wherein the Component e) Is Not Used The used polymer is an Ausimont commercial product (Tecnoflon® N535) having the same monomeric composition of the copolymer of Example 1 and Mooney viscosity ML (1+10 at 121° C.) equal to 48.

The analyses of the end groups carried out by FT-IR, $^1$H-NMR, $^{19}$F-NMR have shown the presence of polar end groups $CH_2OH$ in amounts equal to 6 mmoles/Kg, corresponding to 15% by moles based on the total of the end groups present. The non polar end groups present are $CF_2H$ and $CH_3$.

The fluoroelastomer has been formulated as described in Table 1.

The rheometric data are reported in the same Table.

In this case the crosslinking rate expressed as t'90 results very slow and not acceptable for the automatic moulding of manufactured articles.

Example 6 (Comparative)

Preparation of a Formulation of a VDF/HFP Copolymer Having Ionic End Groups, wherein 6 phr of Component e) Are Used The used polymer is the same of Example 5.

The fluoroelastomer has been formulated as described in Table 1. The rheometric and mechanical properties data are shown in the same Table.

As it can be noticed, the values of stress at break and of compression set are worse than the corresponding values of the Examples of the invention.

Example 7

Preparation of Another Formulation of the Copolymer of Example 1 without Component e)

The fluoroelastomer has been formulated as reported in Table 2, using 9 phr of component d). The amounts of adduct b)+c) and of bisphenol AF reported in Table 2 correspond to 6.1 mmhr of component c) and 1.0 mmhr of component b) (molar ratio accelerant/curing agent 0.12).

The rheometric and mechanical properties are shown in the same Table.

Example 8 (Comparative)

Preparation of a Formulation of the Copolymer Described in Example 1 Containing an Amount of Basic Compound $Ca(OH)_2$ Higher than 2.5 phr The fluoroelastomer of Example 1 has been formulated as reported in Table 2, with 6 phr of component e) and 3 phr of component d). The formulation contains 6.7 mmhr of component c) and 8 mmhr of component b).

The rheometric and mechanical properties are shown in the same Table. The composition results to have a torque and a crosslinking time, expressed as t'90, similar to those of Example 7 of the invention, but the compression set and the combination of stress and elongation at break are worse.

Example 9 (Comparative)

Preparation of a Formulation of the Copolymer Described in Example 5 without Component e)

The fluoroelastomer with ionic end groups of Example 5 has been formulated as resorted in Table 2, with 6 phr of component e) and 3 phr of component d). The formulation contains 6.5 mmhr of component c) and 1.3 mmhr or component b).

The rheometric and mechanical properties are shown in the same Table.

Even if said composition has a molar ratio accelerant/curing agent higher than that of the Examples 1 and 7 of the invention (0.20 against 0.17 and 0.12 respectively, the curing rate is lower; besides, the compression set values for short times of postcure are worse. This Example shows that the polymer polar end group content negatively affects the curing rate.

Example 10

Preparation of a Formulation of the Copolymer Example 1 having a different amount of component b) and c) with respect to that of Example 1.

The fluoroelastomer has been formulated as shown in Table 3, using 7 phr of component d). The formulation contains 4.8 mmhr of component c) and 0.8 mmhr of component b).

Said amounts remain uncharged in she comparative Examples 11–13.

The rheological, rheometric and mechanical properties are shown in the same Table.

Example 11 (Comparative)

Preparation of a Formulation of the Copolymer Having Ionic End Groups of Example 5.

The fluoroelastomer having ionic end groups of Example 5 has been formulated as shown in Table 3, with 6 phr of component e) and 3 phr of component d).

The rheometric and mechanical properties are shown in the same Table.

The composition results to have a crosslinking time, expressed as t'90, comparable with that of Example 10 of the invention, but the compression set and the combination of stress and elongation at break are worse.

Example 12 (Comparative)

Preparation of a Formualtion of the Copolymer of Example 5 wherein Component e) Is Not Used The fluoroelastomer has been formulated with a method equal to that of Example 10, as reported in Table 3. The rheometric properties are shown in the same Table.

It is noticed that the curing time, expressed as t'90, is much higher than that of the composition of Example 10 of the invention, and not acceptable for the automatic moulding of manufactured articles.

Example 13 (Comparative)

Preparation of a Formulation of the Copolymer of Example 5 wherein Component e) is not Present and a High Amount of Component d) is Used The fluoroelastomer has been formulated with a high amount, equal to 14 phr, of component d), as shown in Table 3. The rheological and rheometric properties are shown in the same Table.

It is noticed that the composition of the comparative Example 13 with respect to that of Example 10 of the invention shows:

a higher Mooney viscosity, lower scorch times, expressed as Mooney scorch t5 and ts2 MDR.

Furthermore the composition cures much more slowly (t'90 higher) with respect to that of Example 10 of the invention. The aforesaid properties make the composition unsuitable to the automatic moulding.

TABLE 1

| Example | | | 1 | 2 | 3 comp | 4 comp | 5 comp | 6 comp |
|---|---|---|---|---|---|---|---|---|
| Polymer ex. (VDF/HFP) | | | | Ex. 1 | | | Ex. 5 comp 15% ionic end gr. | |
| b) + c) | XA 51 | phr | | | 2.2 | | | |
| c) | Bisph. AF | " | | | 0.35 | | | |
| d) | Mgo-DE | phr | 7 | 6 | 3 | 4 | 7 | 3 |
| e) | Ca(OH)$_2$ | " | — | 1 | 6 | 3 | — | 6 |
| f) | Black MT | " | 30 | 30 | 30 | 30 | 30 | 30 |
| MDR at 177° C. arc 3°, 12' | | | | | | | | |
| ML | lbf.in | | 1.38 | 1.46 | 1.46 | 1.35 | 1.74 | 1.52 |
| MH | " | | 20.1 | 21.1 | 22.2 | 21.3 | 26.8 | 28.0 |
| ts2 | min | | 1.60 | 1.70 | 1.33 | 1.66 | 2.34 | 1.93 |
| t'50 | " | | 2.24 | 2.34 | 1.62 | 2.09 | 3.65 | 2.35 |
| t'90 | " | | 3.20 | 3.33 | 2.31 | 3.08 | 5.68 | 3.45 |
| Post cure (p.c.) 250° C. x 1 h | | | | | | | | |
| M100 | MPa | | 5.4 | 6 | 6.1 | 5.9 | | 6.9 |
| CR | " | | 16.9 | 16.9 | 15.4 | 15.2 | | 14.5 |
| AR | % | | 214 | 202 | 198 | 201 | | 181 |
| Shore A hardness | | | 70 | 71 | 72 | 71 | | 75 |
| p.c. 250° C. x 2 h | | | | | | | | |
| M100 | MPa | | 5.5 | 6 | 6.4 | 5.9 | | 7.2 |
| CR | " | | 18.1 | 16.8 | 15.2 | 15 | | 15.4 |
| AR | % | | 214 | 196 | 187 | 193 | | 185 |
| Shore A hardness | | | 70 | 71 | 72 | 71 | | 75 |
| p.c. 250° C. x 8 h + 16 h | | | | | | | | |
| M100 | MPa | | 5.6 | 6.4 | 6.7 | 6.2 | | 8.4 |
| CR | " | | 18.0 | 17.0 | 15.0 | 15.7 | | 16.2 |
| AR | % | | 201 | 185 | 178 | 182 | | 162 |

TABLE 1-continued

| Example | 1 | 2 | 3 comp | 4 comp | 5 comp | 6 comp |
|---|---|---|---|---|---|---|
| Shore A hardness | 71 | 71 | 73 | 71 | | 76 |
| Compression set O-Ring 200° C. 70 h (%) | | | | | | |
| p.c. 250° C. 1 h | 16 | 16 | 18 | 17 | | 21 |
| p.c. 250° C. 2 h | 15 | 15 | 17 | 15 | | 19 |
| p.c. 250° C. 8 h | 13 | 13 | 15 | 13 | | 14 |

TABLE 2

| Examples | | 7 | 8 comp | 9 comp |
|---|---|---|---|---|
| Polymer Ex. 1 | | 100 | 100 | |
| Polymer Ex. 5 comp | | | | 100 |
| b) + c) XA51 | phr | 2.0 | 1.7 | 2.62 |
| c) Bisphenol AF | " | 0.40 | 0.6 | |
| d) MgO | " | 9 | 6 | 7 |
| e) Ca(OH)$_2$ | " | | 3 | |
| f) MT N990 | " | 30 | 30 | 30 |
| MDR at 177° C., arc 0.5° | | | | |
| ML | lbf.in | 1.53 | 1.36 | 1.68 |
| MH | lbf.in | 19.7 | 21.6 | 26.7 |
| ts2 | min | 1.48 | 1.67 | 1.66 |
| t'50 | " | 2.12 | 2.02 | 2.47 |
| t'90 | " | 3.14 | 2.97 | 3.90 |
| Mechanical properties after post cure (p.c.) 250° C. x 2 h | | | | |
| M100 | MPa | 5.5 | 5.5 | 7.1 |
| CR | MPa | 17.1 | 14.2 | 18.1 |
| AR | % | 221 | 203 | 194 |
| Hardness | Sh. A | 72 | 72 | 73 |
| Compression set O-R 200° C. 70 h (%) | | | | |
| p.c. 250° C. 1 h | % | 18 | 19 | 20 |
| p.c. 250° C. 2 h | % | 16 | 18 | 18 |
| p.c. 250° C. 8 h + 16 h | % | 13 | 15 | 13 |

TABLE 3

| Example | | 10 | 11 comp. | 12 comp. | 13 comp. |
|---|---|---|---|---|---|
| Polymer | | ex. 1 | with 15% ionic end groups (ex. 5 comp.) | | |
| b) + c) XA51 | phr | | 1.6 | | |
| c) Bis-AF | " | | 0.30 | | |
| d) MgO | phr | 7 | 3 | 7 | 14 |
| e) Ca(OH)$_2$ | " | 0 | 6 | 0 | 0 |
| f) Black MT N990 | " | 30 | 30 | 30 | 30 |
| Mooney compound ML (1 + 10), 121° C. | MU | 73 | | | 100 |
| Mooney scorch at 135° C. | | | | | |
| t15 | min | 61 | | | 27 |
| MDR at 177° C., arc 0.5° | | | | | |
| ML | lbf.in | 1.46 | 1.48 | 1.67 | 2.27 |
| MHF | lbf.in | 15.0 | 21.3 | 18.9 | 13.6 |
| ts2 | min | 1.69 | 1.82 | 2.68 | 1.40 |
| t'50 | min | 2.66 | 2.30 | 5.33 | 3.01 |
| t'90 | min | 4.06 | 3.61 | 9.70 | 11.3 |
| Mechanical properties after postcure 250° C. x 1 h | | | | | |
| M100% | MPa | 4.1 | 5.1 | | |
| Stress at break | MPa | 16.1 | 15.5 | | |
| Elong. at break | % | 246 | 230 | | |
| Shore A hardness | points | 68 | 71 | | |
| Mechanical properties after postcure 250° C. x (8 + 16) h | | | | | |
| M100% | MPa | 4.3 | 6.2 | | |
| Stress at break | MPa | 18.0 | 17.4 | | |
| Elong. at break | % | 236 | 206 | | |
| Shore A hardness | points | 69 | 73 | | |
| Compression set on O-ring 214, 200° C. x 70 h after post cure at: | | | | | |
| 250° C. x 1 h | % | 16 | 20 | | |
| 250° C. x 2 h | % | 15 | 18 | | |
| 250° C. x (8 + 16) h | % | 14 | 14 | | |

What is claimed is:

1. Fluoroelastomers curable by ionic route based on vinylidene fluoride (VDF) comprising:
    a) 100 parts by weight of fluoroelastomer based on vinylidene fluoride (VDF) having an amount of polar end group lower than 3% by moles;
    b) from 0.05 to 5 phr of accelerant;
    c) from 0.5 to 15 phr of curing agent;
    d) from 1 to 40 phr of one or more inorganic acid acceptors;
    e) from 0 to 2.5 phr of one or more basic compounds;
    f) from 0 to 80 phr of reinforcing fillers.

2. Curable fluoroelastomers according to claim 1, wherein the fluoroelastomers component a) comprise VDF copolymers containing at least another ethylenically unsaturated fluorinated comonomer selected from the following:
    $C_2$–$C_8$ perfluoroolefins;
    $C_2$–$C_8$ fluoroolefins containing hydrogen and/or chlorine and/or bromine and/or iodine;
    fluorovinylethers (VE) selected from:
        (per)fluoroalklylvinylethers (PAVE) $CF_2$=$CFOR_f$ wherein $R_f$ is a $C_1$–$C_6$ (per)fluroalkyl;
        perfluoro-oxyalkylvinylethers $CF_2$=$CFOX$, wherein X is a $C_1$–$C_{12}$ perfluorooxyalkyl having one or more ether groups;
        $CF_2$=$CFOCF_2OCF_2CF_3$ (A-III) and $CF_2$=$CFOCF_2OCF_2$—$CF_2OCF_3$ (A-IV).

3. Curable fluoroelastomers according to claim 1, wherein component a) contains non fluorinated $C_2$–$C_8$ olefins (Ol).

4. Curable fluoroelastomers according to claim 1, wherein components a) contains an amount from 0.01 to 5% by moles of units deriving from a fluorinated bis-olefin.

5. Curable fluoroelastomers according to claim 1, wherein component a) has the following composition in % by moles:
    VDF 45–85%, HFP 15–45%, TFE 0–30%;
    VDF 20–30%, HFP 15–40%, TFE 0–30%, Ol 5–30%, PAVE 0–35%;
    VDF 60–75%, HFP 10–25%, VE 0–15%, TFE 0–20%.

6. Curable fluoroelastomers according to claim 1, wherein component a) contains an amount of polar end groups lower than 1% by moles with respect to the total amount of end groups.

7. Curable fluoroelastomers according to claim 1, wherein component b) is an organic -onium derivative.

8. Curable fluoroelastomers according to claim 7, wherein the organic -onium compounds contain an heteroatom selected from N, P, S, O linked to organic or inorganic or inorganic groups.

9. Curable fluoroelastomers according to claim 7, wherein component b) is selected from quaternary ammonium or phosphonium salts or amino-phosphonium salts.

10. Curable fluoroelastomers according to claim 9, wherein component b) is selected from the following: triphenylbenzylphosphonium chloride, tetraphenylphosphonium chloride, terrabutylammonium chloride, tetrabutylammonium bisulphate, tetrabutylammonium bromide, tributylallylphosphonium chloride, tributylbenzylphosphonium chloride, dibutyldiphenylphosphonium chloride, tetrabutylphosphonium chloride, triarylsulphonium chloride, salts of benzyldiphenyl(diethylamino) phosphonium and of benzyltris(dimethylamino) phosphonium.

11. Curable fluoroelastomers according to claim 1, component c) is selected from polyhydroxylated, aromatic or aliphatic compounds or derivatives thereof.

12. Curable fluoroelastomers according to claim 11, wherein component c) is selected from bisphenols.

13. Curable fluoroelastomers according to claim 12, wherein component c) is bisphenol AF, hexafluoro isopropylidene bis (4-hydroxybenzene).

14. Curable fluoroelastomers according to claim 7, wherein instead of component b) and c) an adduct of component b) with component c) is used.

15. Curable fluoroelastomers according to claim 14, wherein the adduct is formed by bisphenol and an -onium salt, in molar ratios from 1:1 to 5:1, preferably from 2:1 to 5:1.

16. Curable fluoroelastomers according to claim 14, wherein the adduct is used in the presence of the accelerant component b).

17. Curable fluoroelastomers according to claim 14, wherein the adduct is used in the presence of the curing agent component c).

18. Curable fluoroelastomers according to claim 14, wherein the adduct contains cations selected from the following: 1,1-diphenyl-1-benzyl-N-diethyl-phosphoranamine, tetrabutyl phosphonium, tetrabutyl ammonium, and anions selected from bisphenol compounds wherein the two aromatic rings are linked by an alkylenic group selected from the perfluoroalkylenic groups having from 3 to 7 carbon atoms, and the hydroxyls in the aromatic rings are in para position.

19. Curable fluoroelastomers according to claim 18, wherein the adduct contains cations selected from the following: 1,1-diphenyl-1-benzyl-N-diethyl-phosphoranamine, tetrabutyl phosphonium, tetrabutyl ammonium, and the anion is the bisphenol AF.

20. Curable fluoroelastomers according to claim 1, wherein the inorganic acid acceptor component d) is selected from the acceptors used in ionic curing of vinylidene fluoride copolymers, preferable ZnO, MgO, PbO.

21. Curable fluoroelastomers according to claim 1, wherein the basic compound component e) is selected from those used in ionic curing of vinylidene fluoride copolymers, preferably selected from $Ca(OH)_2$, $Sr(OH)_2$, $Ba(OH)_2$, or from the metal salts of weak acids, preferably carbonates, benzoates, oxalates and phosphites of Ca, Sr, Ba, Na and K.

22. Curable fluoroelastomers according to claim 1, wherein component f) is selected from the following: carbon black, barium sulphate, silicas, silicates, semicrystalline fluoropolymers.

23. Curable fluoroelastomers according to claim 22, wherein the semi-crystalline fluoropolymer has sizes from 5 to 90 nm, preferably from 10 to 60.

24. Curable fluoroelastomers according to claim 1, comprising additives, thickeners, pigments, antioxidants, stabilizers, processing supporting agents.

25. Curable fluoroelastomers according to claim 24, wherein as processing supporting agents sulphur oxides diorgano substituted, selected from sulphones and sulpholanes in amounts from 0.01 to 5 phr, are used.

26. Cured fluoroelastomers according to claim 1.

27. Fluoroelastomers according to claim 26, cured by ionic route.

28. Manufactured articles obtainable with the cured fluoroelastomers of claim 26.

29. Manufactured articles according to claim 28, selected from O-rings, gaskets, shaft seals, hoses.

30. Curable fluoroelastomer according to claim 1, wherein d) is a bivalent metal oxide and e) is from 0 to 1.5 phr.

31. Curable fluoroelastomer according to claim 1 or claim 30, wherein e) is a hydroxide of a bivalent metal or a weak acid metal salt.

32. Curable fluoroelastomers according to claim 6, wherein in component a), the amount of polar end groups is zero with respect to the total amount of end groups.

* * * * *